UNITED STATES PATENT OFFICE 2,139,722

HYDROGENATION OF COUMARONE-INDENE RESINS

William H. Carmody, Pittsburgh, Pa., assignor to The Neville Company, Pittsburgh, Pa., a corporation of Pennsylvania No Drawing. Application December 2, 1936, Serial No. 113,830

5 Claims. (Cl. 260—7)

This invention relates to the treatment of coumarone-indene resin to minimize its tendency to discolor.

Ordinary commercial coumarone-indene resin is subject to discoloration which is objectionable in certain applications to which the resin is particularly adapted. Thus, the resin and its solutions darken in the course of time, but the phenomenon is particularly prominent and objectionable in films of or containing the resin, particularly colorless or light-colored varnishes, paints and the like. Films formed from these and similar coating compositions develop a pronounced yellow color which appears with passage of time or on exposure to atmospheric oxygen, and which is expedited and intensified by exposure to light. This reactivity of the resin likewise manifests itself in the manufacture of cooked varnish because it reacts with other constituents of the varnish, such as tung oil, to cause the product to be much darker than the color of the original constituents.

In my copending application Serial No. 1,897, filed January 15, 1935, I have disclosed and claimed a method of treating coumarone-indene resin to overcome the foregoing objectionable properties. In accordance with that invention the resin is hydrogenated, and thereby is converted into a hydrogenated product which is much less liable to discoloration, as well as of improved solubility, as compared with the original resin. I now believe that the discoloration and reactivity referred to are due to the formation of a fulvene grouping in the resin, and that hydrogenation destroys its ability to form such a structure, with consequent destruction or minimizing of its ability to form the highly colored bodies which fulvenes are capable of producing.

More particularly, the indene monomer is colorless but its cyclopentadiene ring can react with aldehydes and ketones with formation of colored products:

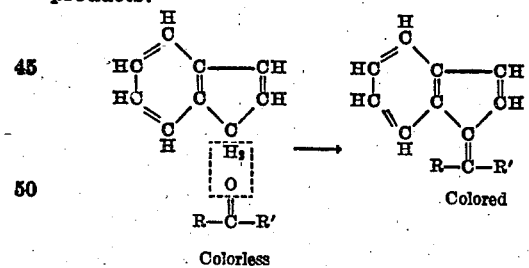

Colorless → Colored

This reaction produces a fulvene linkage, i. e., a methylenic linkage flanked on each side by a double bond, and such structures are more or less strongly colored.

The precise structure of the indene polymer is not known but it is quite certain that the terminal member is similar to the monomer and thus is capable of reacting in similar manner:

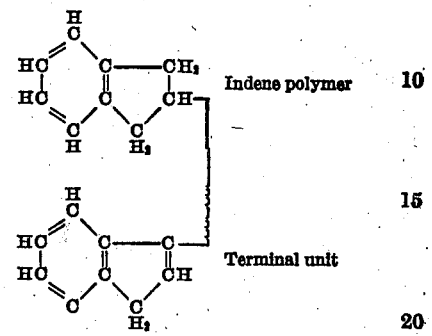

Indene polymer

Terminal unit

After-yellowing thus is probably due to reaction of the terminal member with a C=O group, and this may be supplied by oxidation of a terminal member of a molecule of the resin through the influence of light, which may be represented as follows:

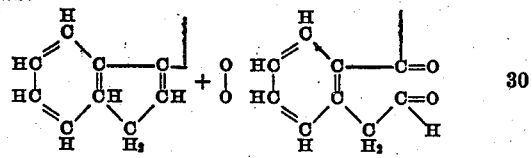

which can react with an unoxidized terminal member of another molecule the resin in the manner shown above for the monomer.

I now believe that the effect of hydrogenation in repressing after-yellowing and other discoloration, such as the darkening which occurs in varnish cooking, results from saturation of the double bond in the cyclopentadiene ring of the terminal unit in the resin:

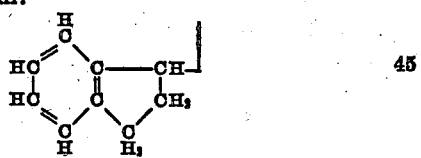

from which it will be seen that even if this substance reacts with C=O, the fulvene grouping will not be produced, and thus the production of colored bodies is avoided.

Extensive investigation of the process of my aforesaid application has shown that although it marks a real advance in the art and is capable of providing materially improved resin, rather definite minimum amounts of catalyst are necessary to produce material improvement in the resistance to yellowing, and that larger amounts of hydrogen are consumed than are theoretically necessary to eliminate the yellowing tendency.

In the hydrogenation of coumarone-indene resin it is possible for the hydrogenation to follow various courses, as will be evident from the foregoing structural formulae. At least three hydrogenation paths are possible. The first, and the least important from the standpoint of ease of attainment and quantity of hydrogen consumed, is that of bleaching of the resin. That is, ordinary resin of this type is naturally rather dark colored, and one feature of the hydrogenation process disclosed in my aforesaid application is that the hydrogenated product is virtually water-white, due, apparently, to hydrogenation of minute amounts of strongly colored impurities. This bleaching due to hydrogenation is easily accomplished, however, and requires relatively little hydrogen.

The two significant paths of hydrogenation presented, are, first, hydrogenation of the aromatic ring, and second, hydrogenation of the double bond in the cyclopentadiene nucleus of the terminal indene unit, and these afford competing reactions. Hydrogenation of the aromatic ring is of value because it causes the product more closely to approach the cycloparaffins, which improves its solubility in the cheap hydrocarbon solvents which are favored commercially. Total hydrogenation of the aromatic rings is not necessary to this end, however, for when the resin has a solubility of, say, 0° to —10° C., it is satisfactory for most commercial purposes, and this degree of solubility is attained by hydrogenation considerably short of saturation of the benzene nucleus. Moreover, complete saturation of the benzene nucleus requires large quantities of hydrogen, much more than is needed to avoid after-yellowing.

As will be observed, each unit of the resin polymer presents six points for hydrogenation of the aromatic nucleus. In contrast, there are but two points in the entire polymer in which hydrogenation exerts any effect upon the yellowing tendency, namely, the

grouping in the cyclopentadiene ring of the terminal unit. Hence it is that in a polymer containing, say, seven indene units there are at least forty points where hydrogen may enter the aromatic nucleus as against two points where hydrogen may enter to destroy the after-yellowing tendency. Of the total hydrogen that may be used, 95.25 per cent would thus go to the aromatic nuclei, and but 4.75 per cent would be needed to saturate the double bond which is responsible for the undesirable discoloration.

Experience has shown that the tendency is for the hydrogen to preponderantly enter the aromatic rings, and that in some instances saturation of the double bond, normally the most easily hydrogenated, in the terminal member to be incomplete, in consequence of which the yellowing tendency, while reduced, is not essentially or sufficiently eliminated. More particularly, it has been found that although the resin is hydrogenated to, say, 90 per cent of the extent theoretically possible, the product may in some instances still possess substantial yellowing tendency. Despite the small proportion of hydrogen necessary to saturate the bond which causes yellowing, the competition afforded by the aromatic rings is such that in such cases only about half of that amount actually does enter the double bond, thus leaving a portion of the resin with the capability of after-yellowing. On the other hand, to eliminate after-yellowing all of the 4.75 per cent necessary for saturating the double bond must be introduced at that point.

It is among the objects of this invention to provide an improved method of hydrogenating coumarone-indene resin whereby more satisfactorily and certainly to achieve elimination of after-yellowing, in the practice of which smaller amounts of catalyst and hydrogen may be used than heretofore, and which is readily practiced.

The invention is predicated upon my discovery that satisfactorily complete saturation of the double bond which is responsible for after-yellowing may be accomplished while effecting sufficient hydrogenation of aromatic rings to provide suitable solubility, by initially treating the resin to remove foreign matter which if present during hydrogenation causes the aromatic rings to be hydrogenated at the expense of the double bond which is sought to be eliminated. More particularly, I now believe, although I do not confine myself to this theory, that ordinary commercial coumarone-indene resin contains some substance or substances which depreciate the activity of the hydrogenation catalyst to a point where hydrogenation of the rings may be accomplished satisfactorily, but such that vigorous and complete saturation of the double bond in question is not accomplished.

The invention may be practiced in various ways and by various means. The resin may be, and preferably is, initially treated in liquid condition with a material capable of adsorbing or absorbing the poisons in question, examples being bentonite clay and various other adsorbents of similar nature which are well known in the art. Also, there may be used metals, preferably in finely divided form, and particularly in a form presenting such a large surface as to possess adsorbent qualities, such as metallic hydrogenation catalysts.

Preferably the treatment is applied to a solution of the resin, most suitably at an elevated temperature and with agitation. The adsorbent is suspended in the resin solution, the mixture is heated and agitated for a period of time to cause the impurities to be fixed, and the adsorbent is then removed, as by filtration. The purified resin solution is then in condition for hydrogenation.

As showing that a definite minimal amount of catalyst is necessary in the hydrogenation of untreated resin, and that the effect increases with increasing amounts of catalyst, reference may be made to tests in which solutions of the same amount of resin and the same amount of the same solvent were heated in a bomb to 200° C. and hydrogenated using metallic nickel at a gauge pressure of 900 lbs. The catalyst was prepared by adding 200-mesh nickel-aluminum alloy to caustic soda solution, washing the resultant sponge nickel with water to remove salts, transferring to a petroleum liquid without undue exposure to air, heating to drive off water residues, and then adding the suspension to the resin solution. The amount of catalyst used, the solubility, and the reduction in yellowing, are shown in the following tabulation:

|  | Hydrogenation time | Yellowing | Solubility |
|---|---|---|---|
|  | Hours | Percent | °C. |
| Untreated resin | | 100 | 59 to 56 |
| 3% of catalyst | 12 | 51 | 27 to 24 |
| 4% of catalyst | 7 | 42 | −63 |
| 6% of catalyst | 8 | 27 | −65 |

The degree of yellowing capacity is determined in the following manner. It has been found that standard commercial grades of this resin when exposed in the form of a film to concentrated sources of ultra-violet light, such as a quartz tube mercury vapor lamp, become progressively more yellow up to about five hours exposure, beyond which further exposure does not appear to materially deepen the color. Such a fully developed color is taken as a standard of 100 per cent yellowing capacity and used as a basis of comparison. Films of treated resin are then exposed for the same time, and by the use of a color comparator, or colorimeter, the yellowing capacity is thus determined.

As appears from the foregoing tabulation, where the temperature, pressure, resin concentration and solvent used are kept constant, an increase in the amount of catalyst from 3 per cent to 6 per cent causes a decided increase in the extent of hydrogenation. Below 3 per cent of catalyst the reaction is slow and unsatisfactorily complete, while above about 6 per cent of catalyst the improvement is not sufficient to justify the added expense of the increased catalyst.

It will be observed that the poorest results were obtained with 3 per cent of catalyst, and this may be taken as a basis of comparison to show the substantial benefits which flow from the present invention, as exemplified by the tests now to be described.

*Example 1.*—A solution of 4500 grams of "Nevindene" resin sold by The Neville Company, of Pittsburgh, Pa., in 4000 cc. of solvent was placed in a bomb together with 135 grams of nickel catalyst prepared as described hereinabove. The contents of the bomb were heated to 200° C. and hydrogenated for twelve hours at a constant gauge pressure of 900 lbs. The resin possessed the characteristics shown for 3 per cent of catalyst in the foregoing tabulation.

"Nevindene" is a polyindene resin polymerization product resulting from the acid treatment of crude solvent naphtha containing indene. The Nevindene resin used in the foregoing example had a molecular weight of about 800, and a melting point of approximately 160° C. Its color was about ¾ to 1, its acid value was not over 0.2, and its saponification number was not over 0.2.

*Example 2.*—A solution the same as that used in Example 1 was charged into the bomb together with 450 grams of bentonite clay. The mixture was warmed to 200° C. and agitated during six hours. It was then cooled and filtered to separate the clay, and the clean filtrate was charged back into the cleaned bomb, 135 grams of nickel catalyst were added, and hydrogenation was effected at 200° C. during eight hours with a gauge pressure of 900 lbs. The solution was filtered to remove the nickel catalyst, and the resin was recovered by distillation of the solvent. The yellowing of this resin was but 38 per cent, and the resin showed a solubility of −48° C., thus showing the use of adsorbent clay in pretreatment to be effective in removing substances ordinarily injurious to the activity of the catalyst.

*Example 3.*—In this test a solution the same as that used in Examples 1 and 2 was placed in the bomb together with 135 grams of the nickel catalyst, and the mixture was warmed to 200° C. and agitated during six hours, following which it was cooled, filtered, and the clean solution charged back into the cleaned bomb together with 135 grams of fresh nickel catalyst, following which hydrogenation was carried out as in the other examples. The resin recovered as described above, exhibited a yellowing tendency of but 9 per cent. Its solubility was −65° C., and this degree of solubility was attained three hours after the treatment was started.

The results of these tests are summarized in the following tabulation:

|  | Example 1 | Example 2 | Example 3 |
|---|---|---|---|
| Pretreatment | None | 10% clay | 3% nickel |
| Yellowing | 51% | 38% | 9% |
| Solubility | 27° to 24° C. | −48° C. | −65° C. |

Thus it is seen that with conditions constant, pretreatment has a profound effect upon the character and extent of the hydrogenation. As to character of hydrogenation, the pretreatment materially directs hydrogenation into the double bond which is responsible for yellowing, and as to the extent of hydrogenation, pretreatment substantially improves the solubility. It appears also from Nos. 1 and 2 and the previous tabulation that by pretreatment the reduction in yellowing is not only greatly enhanced, but also is better than is attained with larger amounts of catalyst applied to untreated resin.

My work has shown that if the resin is not pretreated the hydrogenation catalyst may act principally to direct the hydrogenation into the aromatic rings, with real improvement in solubility but with incomplete attainment of non-yellowing characteristics, while the pretreatment in accordance with this invention favors complete saturation of the critical double bond. Thus of the 4.75 per cent proportion of hydrogen which is necessary to eliminate yellowing, about 2.3 per cent does not enter the double bond. In contrast, the pretreatment causes substantially complete saturation of the critical double bond, eliminating or substantially reducing the yellowing.

A resin showing 9 per cent of yellowing, such as produced in Example 3 is for all practical purposes completely non-yellowing. That is, the extent to which it will yellow is considered in the paint and varnish trade to be negligible. Accordingly, the pretreatment provided by this invention permits directing and encouraging hydrogenation at the point which eliminates yellowing, while at the same time adequate solubility characteristics are attained.

In my investigations it has been observed, using catalytic nickel for the pretreatment, that the nickel filtered from the solution after pretreatment has a dark-colored resinous material strongly adsorbed on its surface. This material can be removed by washing with aromatic solvents, but not with petroleum benzene. Treatment of such nickel with acid has not given any detectable odor of hydrogen sulfide. For these reasons I now believe that the pretreatment removes some resinous or oily body which while not a true catalyst poison in the ordinary sense of the word, yet blankets the nickel and reduces its activity so that although it can still cause hydrogenation of the aromatic nucleus, it is less efficient in hydrogenating the double bond which is sought to be completely eliminated. The pretreatment and removal of this oily or resinous matter apparently permits the catalyst to maintain constant high activity in saturating the double bond.

Instead of nickel for the pretreatment there may be used other metals and materials, such as metallic copper, iron, cobalt, sodium, and potassium, and apparently caustic soda or caustic potash will likewise be effective. While reference has been made to the use of catalytic nickel, it is not necessary that this be freshly prepared, it being possible to use nickel catalyst recovered from a preceding hydrogenation, thus effecting economies in the practice of the invention.

According to the provisions of the Patent Statutes, I have explained the principle and manner of practicing my invention and have described what I now consider to represent its best embodiment. However, I desire to have its understood that, within the scope of the appended claims, the invention may be practiced otherwise than as specifically described.

I claim:

1. That method of catalytically hydrogenating coumarone-indene resin comprising removing catalyst poison from said resin and thereby conditioning the resin for hydrogen saturation of the cyclopentadiene ring of the terminal unit of the indene polymer of said resin, then subjecting the resin to gaseous hydrogen in the presence of a hydrogenation catalyst and at a temperature above normal room temperature but below that at which the resin decomposes, and thereby effecting hydrogenation of the resin, and separating the hydrogenated resin from said catalyst.

2. That method of catalytically hydrogenating coumarone-indene resin comprising dissolving the resin in a solvent, removing catalyst poison from the resin solution and thereby conditioning the resin for hydrogen saturation of the cyclopentadiene ring of the terminal unit of the indene polymer of said resin, then subjecting the resin to gaseous hydrogen in the presence of catalytically active nickel at a temperature above normal room temperature but below that at which the resin decomposes, and thereby effecting hydrogenation of the resin, and separating the hydrogenated resin from said catalyst.

3. That method of catalytically hydrogenating coumarone-indene resin comprising forming a solution of the resin, intimately contacting said resin with an adsorbent material and thereby removing catalyst poison from said resin and thereby conditioning the resin for hydrogen saturation of the cyclopentadiene ring of the terminal unit of the indene polymer of said resin, separating the solution from said adsorbent material, then subjecting the resin to gaseous hydrogen in the presence of an hydrogenation catalyst and at a temperature above normal room temperature but below that at which the resin decomposes, and thereby effecting hydrogenation of the resin, and separating the hydrogenated resin from said catalyst.

4. That method of catalytically hydrogenating coumarone-indene resin comprising intimately contacting a solution of the resin with catalytic nickel and thereby removing catalyst poison from said resin and thereby conditioning the resin for hydrogen saturation of the cyclopentadiene ring of the terminal unit of the indene polymer of said resin, separating the nickel from said solution, then subjecting the resin to gaseous hydrogen in the presence of catalytic nickel and at a temperature above normal room temperature but below that at which the resin decomposes, and thereby effecting a hydrogenation of the resin, and separating the hydrogenated resin from said catalyst.

5. A method according to claim 4 in which nickel catalyst from said hydrogenation step is used for removal of said poison.

WILLIAM H. CARMODY.